United States Patent
Böker et al.

(10) Patent No.: US 8,482,289 B2
(45) Date of Patent: Jul. 9, 2013

(54) METHOD FOR OPERATING A POWER TOOL WITH A DIAGNOSTIC DEVICE

(75) Inventors: Robert Böker, Winnenden (DE); Heiko Däschner, Leutenbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 427 days.

(21) Appl. No.: 12/958,549

(22) Filed: Dec. 2, 2010

(65) Prior Publication Data
US 2011/0140707 A1 Jun. 16, 2011

(30) Foreign Application Priority Data

Dec. 10, 2009 (DE) .......................... 10 2009 057 731

(51) Int. Cl.
*G01R 31/28* (2006.01)
*H01H 31/02* (2006.01)
(52) U.S. Cl.
USPC .......................................... 324/511; 324/555

(58) Field of Classification Search
USPC .................................................. 324/511, 555
See application file for complete search history.

(56) References Cited

U.S. PATENT DOCUMENTS
7,809,495 B2 10/2010 Leufen

*Primary Examiner* — Amy He
(74) *Attorney, Agent, or Firm* — Gudrun E. Huckett

(57) ABSTRACT

In a method for operating a power tool with a diagnostic device, wherein the power tool has an internal combustion engine, a generator as an energy supply, and an electronic control unit, wherein a diagnostic device is connectable to the electronic control unit, and wherein the electronic control unit has an operating mode and a diagnostic mode, a non-uniform voltage signal is supplied by the generator as an energy supply and a uniform voltage signal is supplied by the diagnostic device as an energy supply. The electronic control unit evaluates the voltage signal that is being supplied as an energy supply and switches to diagnostic mode when the voltage signal is the uniform voltage signal supplied by the diagnostic device.

16 Claims, 4 Drawing Sheets

METHOD FOR OPERATING A POWER TOOL WITH A DIAGNOSTIC DEVICE

BACKGROUND OF THE INVENTION

The present invention concerns a method for operating a power tool with a diagnostic device, wherein the power tool comprises an internal combustion engine, a generator as an energy supply, and an electronic control unit, wherein the generator supplies a non-uniform voltage signal as an energy supply, wherein a diagnostic device is connectable to the electronic control unit, and wherein the electronic control unit has an operating mode and a diagnostic mode.

Such a power tool is disclosed in U.S. Pat. No. 7,809,495 B2. According to this publication it is provided to connect the diagnostic device with the electronic control unit through the short circuit lead or, without contact, through the generator. A diagnosis of the power tool should be possible even when the power tool is shut down. For this purpose, the necessary energy is supplied also through the diagnostic device because the power tool itself has no energy supply device such as, for example, a battery or the like.

The invention has the object to provide a method for operating a power tool with a diagnostic device that is simple to operate and is of a simple configuration.

SUMMARY OF THE INVENTION

This object is solved in that the diagnostic device supplies a uniform voltage signal as an energy supply and the electronic control unit evaluates the voltage signal that is used as an energy supply and switches to diagnostic mode when a uniform voltage signal is detected.

The generator of the power tool supplies a non-uniform voltage signal because the generator is usually connected with the crankshaft of the power tool and the crankshaft, on account of the compression and decompression in the combustion chamber within one rotation of the crankshaft, is subjected to a distinct non-uniform rotation. For example, before the top dead center is reached by the piston, the crankshaft rotates more slowly because at this point the counter force is increased by the pressure in the combustion chamber.

It is provided that the diagnostic device supplies a uniform voltage signal as a energy supply and that the voltage signal provided for supplying energy is evaluated by the electronic control unit. When a uniform voltage signal is detected, the electronic control unit automatically switches over to diagnostic mode. No separate switches or similar components are necessary for switching into the diagnostic mode. The diagnostic device must not transmit special signals or the like when connected with the electronic control unit in order to switch the electronic control unit into the diagnostic mode. Rather, the uniform voltage signal of the diagnostic device that serves as an energy supply of the electronic control unit is used to switch the electronic control unit into the diagnostic mode. In this connection, the uniform voltage signal is advantageously sine-shaped. However, another uniform voltage signal, for example, a rectangular signal or a saw tooth signal, can also be used advantageously. It is provided that the voltage signal is checked only when applying voltage to the electronic control device. However, it may also be provided that the electronic control unit checks also in operation constantly whether a uniform or a non-uniform voltage signal is applied as an energy supply. After switching into the diagnostic mode the voltage signal can have any shape. For example, the signal for the control of the diagnosis to be carried out can be frequency-modulated and/or amplitude-modulated.

The voltage signal is in particular an alternating voltage signal. For analyzing the alternating voltage signal the amplitude duration can be utilized advantageously. The amplitude duration can be evaluated, for example, also in the form of the frequency of the alternating voltage signal. In this connection, the variation of the amplitude duration is advantageously evaluated. For this purpose, for example, differences can be determined between successive amplitude durations and compared to a limit value. When the difference between successive amplitude durations is above a limit value, a non-uniform alternating voltage signal exists. When the difference between successive amplitude durations is below the limit value, the alternating voltage signal is uniform and the electronic control unit switches over into the diagnostic mode.

It may also be provided that the electronic control unit evaluates the amplitude of the alternating voltage signal, in particular the amplitude variation of the alternating voltage signal. In this connection, the differences between successive amplitudes can be calculated also and compared to a limit value. When the difference is below a limit value, a uniform alternating voltage signal exists and the electronic control unit switches to the diagnostic mode.

Advantageously, the electronic control unit selects the diagnosis to be carried out, for example, the measurement to be carried out or the like, as a function of the amplitude duration and/or as a function of the amplitude of the alternating voltage signal. Advantageously, the electronic control unit sets the frequency of the diagnosis to be carried out, for example, the frequency of a measurement that is to be carried out repeatedly, as a function of the amplitude duration. In this way, it is possible to switch in a simple way by means of the voltage signal of the diagnostic device to different diagnostic modes. By means of determining the frequency of the diagnosis to be carried out, different engine speeds of the internal combustion engine can be simulated, for example. In this way, selecting different diagnostic modes and triggering different measurements are thus possible even without a separate communication line between electronic control unit and diagnostic device.

Advantageously, the connection between the diagnostic device and the electronic control unit is realized by electric lines. Expediently, the generator is connected in the operating mode of the electronic control unit through a positive terminal lead or phase lead and a ground lead to the electronic control unit and the diagnostic device is connected in the diagnostic mode through a positive terminal lead, a diagnostic line and a ground lead with the electronic control unit. In this connection, the ground lead can also be eliminated when the generator, the electronic control unit and the diagnostic device each are connected separately with a ground connector. Therefore, the diagnostic device is connected by an additional diagnostic line with the electronic control unit; through this diagnostic line the signal transmission occurs. The positive terminal lead serves for transmitting the energy for operating the electronic control unit and other possibly present components of the power tool, for example, other sensors and/or actuators.

A simple configuration results when the electronic control unit has a connecting jack for the generator and the diagnostic device is connected to the connecting jack for the generator. In usual operation of the power tool, a signal is applied only to the positive terminal lead. The alternating voltage supplied through the positive terminal lead for supplying energy is evaluated constantly by the electronic control unit. As soon as the electronic control unit detects a uniform alternating voltage signal on the positive terminal lead, it switches over to diagnostic mode. In the diagnostic mode it is also possible that data are transferred through the diagnostic connector between the electronic control unit and the connected diagnostic line of the diagnostic device. In this connection, the data transfer can occur advantageously in both directions, i.e., from the diagnostic device to the electronic control unit and from the electronic control unit to the diagnostic device.

In order to be able to also check the generator in the diagnostic mode, it is in particular provided that the generator is connected through the diagnostic device to the electronic control unit. When the generator is connected through the diagnostic device to the electronic control unit, diagnosis is possible also when the power tool is running.

To avoid plug connections it may also be provided that the connection between the diagnostic device and the electronic control unit is realized through an alternating field, in particular through a magnetic or electric alternating field. In this connection, the induction coil of the generator is used advantageously.

It is provided that the electronic control unit is connected with at least one actuator or sensor that is checked by the diagnostic device.

An independent inventive concept concerns a reset state of the electronic control unit into which the electronic control unit can be transferred (reset) by the diagnostic device. In this connection, the reset state is a state of the electronic control unit in which all parameters are returned (reset) to an initial or default state. In order to reset the electronic control unit into the reset state, it is provided that a defined ground signal is supplied to the diagnostic connector. Supplying the ground signal is realized in particular by connecting the diagnostic connector with the ground connector of the diagnostic device. The diagnostic connector of the electronic control unit is in particular a connector of a bus system of the power tool to which, for example, at least one sensor and/or actuator of the power tool is connected. The bus system has a defined ground connector so that by means of this ground connector a reset of the electronic control unit can be carried out in a simple way. Since the diagnostic connector is a connector of a bus system of the power tool, communication is possible with all sensors or actuators of the bus system by means of the diagnostic connector. The sensors or actuators can be controlled in the diagnostic mode and the behavior of the sensors or actuators, such as returned measurement values of the sensors, movements of the actuators, the current pick-up or the like, can be monitored. A diagnosis is thereby possible in an easy manner.

Expediently, at least one actuator is a valve, in particular a water valve or a fuel valve. Advantageously, at least one sensor is a temperature sensor, a pressure sensor or a throttle shaft sensor.

BRIEF DESCRIPTION OF THE DRAWINGS

Embodiments of the invention are explained in the following with the aid of the drawing.

DESCRIPTION OF PREFERRED EMBODIMENTS

Figure 1:
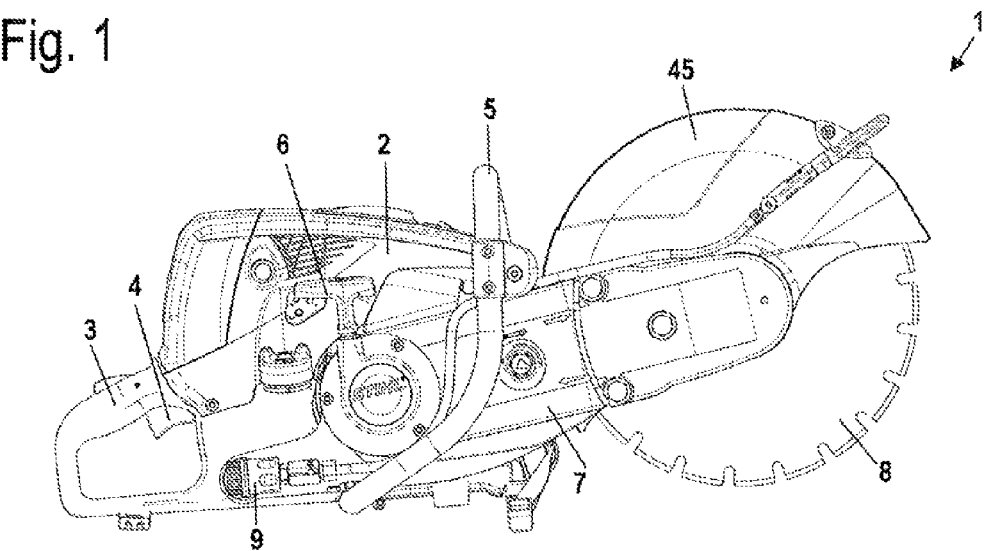
FIG. 1 shows a side view of a hand-guided power tool.

In FIG. 1 a cut-off machine 1 is shown as an embodiment of a hand-guided and portable power tool. However, the suggested method can also be advantageously used in other power tools like a motor chain saw, a trimmer, a lawn mower or the like.

The cut-off machine 1 has a housing 2 in which an internal combustion engine, not shown in FIG. 1, is arranged. A starter device is provided for starting the internal combustion engine; it has a starter handle 6 that projects from the housing 2. On the housing 2 a rear handle 3 and a handle tube 5 for guiding the cut-off machine 1 in operation are provided. On the rear handle 3 a throttle control 4 is arranged for operating the internal combustion engine. On the housing 2 an extension arm 7 is attached that extends forwardly and rotatably supports at its forward end a cutting wheel 8. In operation of the power tool, the cutting wheel 8 is driven in rotation by the internal combustion engine. For cooling the cutting wheel 8 a water supply is provided that has a water connector 9 for connecting it to a water tank. In the area of a protective hood 45 that covers the cutting wheel 8 partially, there is a water valve, not shown in FIG. 1, through which the water flows to the cutting wheel 8.

Figure 2:
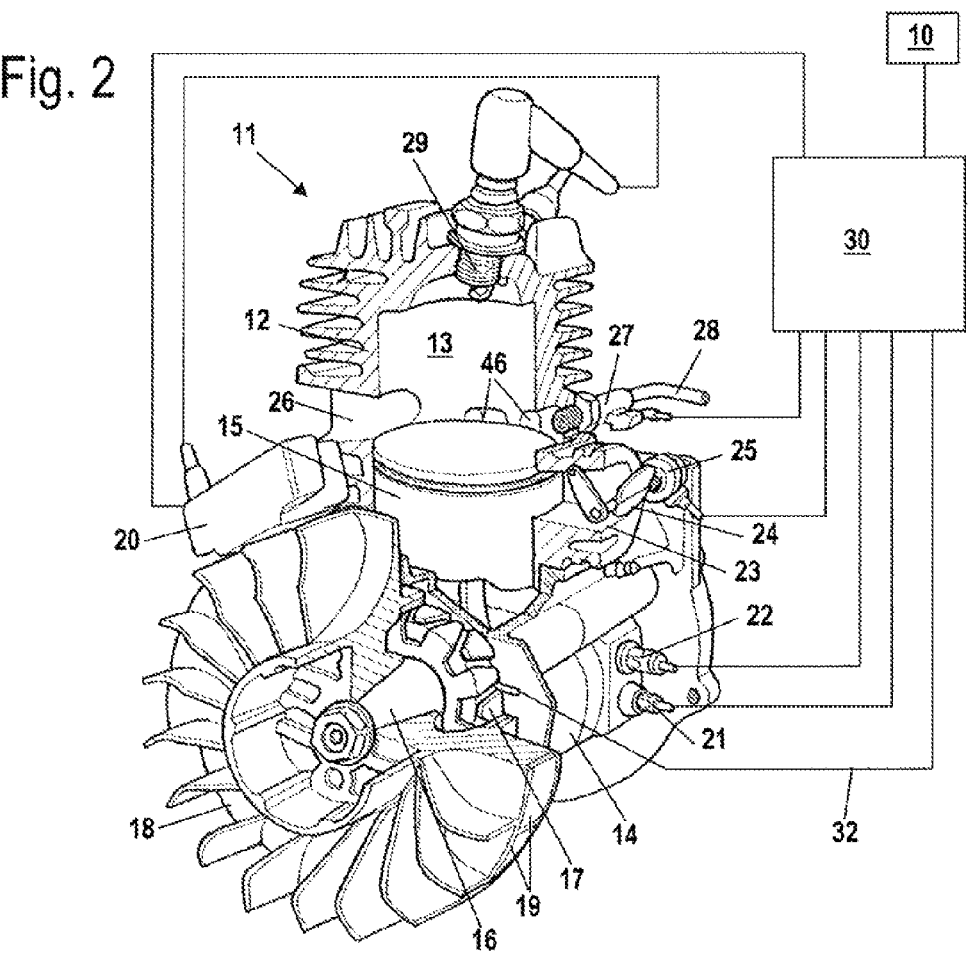
FIG. 2 is a perspective part-sectional view of the internal combustion engine of the power tool showing schematically the connected components.

FIG. 2 shows the internal combustion engine 11 in detail. The internal combustion engine 11 is embodied as a single cylinder two-stroke engine and has a cylinder 12 in which a combustion chamber 13 is embodied. The combustion chamber 13 is delimited by a reciprocating piston 15 supported in the cylinder 12. The piston 15 drives a crankshaft 16 in rotation. The crankshaft 16 is rotatably supported in a crank case 14. On the crank case 14 a generator 17, embodied as a claw pole generator, is attached. The permanent magnets of the generator 17 are arranged in a fan wheel 18 that is fixedly connected to the crankshaft 16 and rotates with the crankshaft 16 in operation of the engine. The generator 17 can also have another configuration. Moreover, the fan wheel 18 carries on its outer side two magnets 19 which interact with an ignition module 20 that is arranged in the outer periphery of the fan wheel 18 and provides the energy for the ignition spark of the spark plug 29 projecting into the combustion chamber 13. It may also be provided that the ignition energy is also supplied by the generator 17. In addition to the generator 17 and optionally the magnets 19, the internal combustion engine 11 has no other device as an energy supply.

For supplying the internal combustion engine 11 with combustion air, an intake passage 23 communicating with the crank case 14 opens at the cylinder 12 and is piston-controlled by the piston 15. In the intake passage 23 a throttle valve 24 is supported pivotably and its position is detected by a throttle shaft sensor 25. An outlet 26 for exhaust gases extends away from the combustion chamber 13. The internal combustion engine 11 has transfer passages 46 that connect the interior of the crank case 14 in the area of the bottom dead center (shown in FIG. 2) of the piston 15 with the combustion chamber 13. Through the transfer passages 46 the combustion air that has been precompressed in the crank case 14 can flow into the combustion chamber 13. A fuel valve 27 connected through a fuel line 28 with a fuel tank, not shown, opens into one of the transfer passages 46. Through the fuel valve 27, fuel is supplied to the combustion air coming from the crank case 14. Moreover, a temperature sensor 21 and a pressure sensor 22 are arranged on the crank case 14.

The internal combustion engine 11 has an electronic control unit 30 connected with the ignition module 20, a water valve 10 that is schematically shown in FIG. 2, the fuel valve 27, the throttle shaft sensor 25, the temperature sensor 21, and the pressure sensor 22 as well as the generator 17. The connection of the generator 17 with the electronic control unit 30 is realized through a connecting line 32 that will be explained in the following in more detail. The ignition module 20 is connected to the spark plug 29 for supplying the ignition energy at the timing provided by the electronic control unit 30.

In operation combustion air is sucked in through the intake passage 23 into the crank case 14 when the piston 15 is in the top dead center area. With the downward stroke of the piston 15 the combustion air is compressed in the crank case 14. As soon as the transfer passages 46 open, the precompressed combustion air streams into the combustion chamber 13. As the combustion air is transferred, fuel is supplied to the combustion air through the fuel valve 27. The fuel is processed to a fuel/air mixture and is further compressed with the upward stroke of the piston 15. In the top dead center area of the piston 15, the fuel/air mixture is ignited in the combustion chamber 13 by the spark plug 29. The piston 15 is accelerated by the combustion in the direction of the crank case 14. As soon as the outlet 26 opens, the exhaust gases stream out of the combustion chamber 13. Through the transfer passages 46 fresh combustion air flows in for the next engine cycle. The electronic control unit 30 controls the water valve 10, the fuel valve 27, and the spark plug 29. For this purpose, engine speed information of the generator 17, temperature values of the temperature sensor 21, and pressure values of the pressure sensor 22 are evaluated. The position of the throttle valve 24 is also determined by means of the throttle shaft sensor 25. However, the position of the throttle valve 24 can be determined also through other means, for example, indirectly based on the pressure in the crank case 14.

Figure 3:
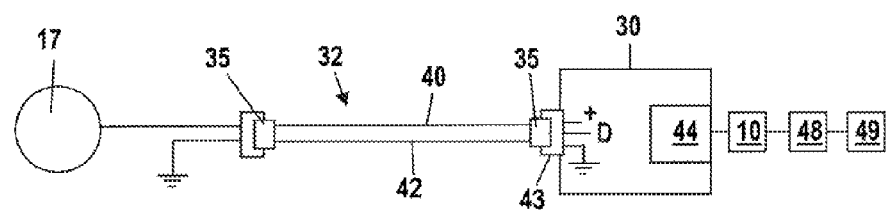
FIG. 3 is a schematic illustration of the connection of the generator with the electronic control unit.

As shown in FIG. 3, the generator 17 is connected through the connecting line 32 that carries at its ends a plug connector 35, respectively, with the electronic control unit 30. The electronic control unit 30 has for this purpose a connecting jack 43 with three terminals, namely a ground connector, a positive terminal as well as a diagnostic connector D. The connecting line 32 has two leads, namely a positive terminal lead 40 and a ground lead 42. The diagnostic connector D is not used in this array. The positive terminal lead 40 can also be a phase lead.

As FIG. 3 shows schematically, the electronic control unit 30 has a bus system 44 to which the water valve 10 and one or several sensors 48 and/or further actuators 49 are connected.

Figure 4:
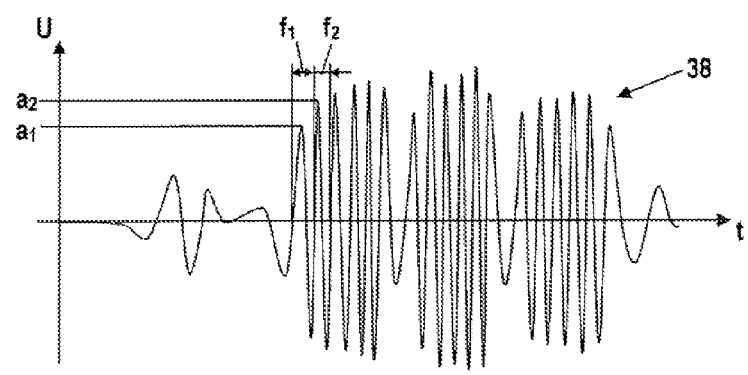
FIG. 4 is a schematic illustration of the course of the generator voltage.

FIG. 4 shows the course of the voltage (U) that is generated by the generator 17. After starting the internal combustion engine 11 a non-uniform alternating voltage signal 38 is generated that is characterized by sine oscillations of different amplitude and amplitude duration. In this connection, the amplitude duration $f_1$ and $f_2$ is schematically indicated in FIG. 4 for two of the illustrated amplitudes and the corresponding amplitude values are identified at $a_1$ and $a_2$. As shown in FIG. 4, the amplitude durations $f_1$, $f_2$ and the amplitudes $a_1$, $a_2$ of neighboring oscillations fluctuate relatively strongly. This asymmetry of the alternating voltage signal 38 is detected by the electronic control unit 30. For this purpose, the electronic control unit 30, when a voltage is applied, can determine the difference between the amplitude duration $f_1$, $f_2$ of successive oscillations and compare it to a limit value. When the difference is greater than the limit value, a non-uniform alternating voltage signal 38 is being applied. Likewise, the electronic control unit can evaluate the amplitude of the alternating voltage signal, for example, by difference calculation of the amplitudes $a_1$, $a_2$ of successive oscillations and comparison of the difference with a limit value. When the difference is greater than the limit value, a non-uniform alternating voltage signal 38 is being applied. If the electronic control unit 30 recognizes a non-uniform alternating voltage signal 38 at the positive terminal, it remains in the operating mode. In the operating mode, for example, the engine speeds of the internal combustion engine 11 are determined from the alternating voltage signal of the generator 17. Other characteristic values of the internal combustion engine can be derived from the alternating voltage signal of the generator 17. In the operating mode the electronic control unit 30 controls the fuel valve 27, the water valve 10, and the spark plug 29 for operating the internal combustion engine 11. For this purpose, supplied data of the temperature sensor 21, the pressure sensor 22 and/or the throttle shaft sensor 25 as well as information from the alternating voltage signal 38 of the generator 17 can be used. It may also be provided that the electronic control unit 30 monitors and evaluates the applied voltage signal constantly.

Figure 5:
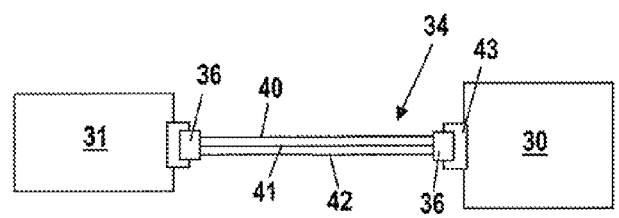
FIG. 5 is a schematic illustration of a connection of a diagnostic device with the electronic control unit.

When malfunctions of the cut-off machine 1 are detected or when the cut-off machine 1 is to be serviced, the cut-off machine 1 can be connected in a service situation to a diagnostic device 31. Such a device 31 is schematically shown in FIG. 5. The diagnostic device 31 can be connected through a connecting line 34 with the electronic control unit 30 to establish a connection. The connecting line 34 has three leads, namely a positive terminal lead 40, a diagnostic line 41, and a ground lead 42. The ground lead 42 can be eliminated if the diagnostic device 31 and the electronic control unit 30 are grounded individually. The connecting line 34 has at its ends plug connectors 36 for connecting it with the diagnostic device 31 and the electronic control unit 30. A plug connector 36 is inserted into the connecting jack 43 of the electronic control unit 30 in which in operation the connecting line 32 to the generator 17 is plugged in.

Figure 6:
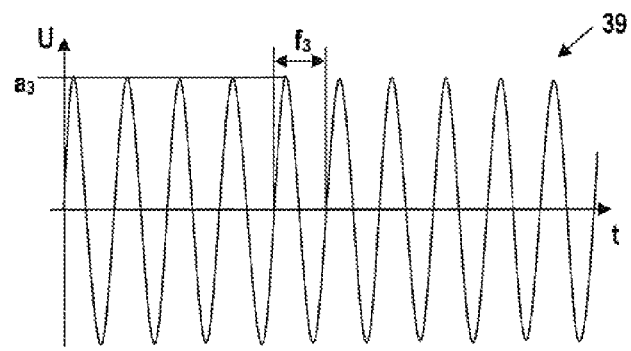
FIG. 6 is a schematic illustration of the alternating voltage signal of the diagnostic device.

The diagnostic device 31 also supplies the electronic control unit 30 with energy. For this purpose, through the positive terminal lead 40 a uniform alternating voltage signal 39 shown in FIG. 6 is transmitted. In the illustrated embodiment the alternating voltage signal 39 is sine-shaped. However, another uniform voltage signal, for example, a rectangular voltage signal, a saw tooth voltage signal or the like can be also used for switching into the diagnostic mode. The alternating voltage signal 39 has an amplitude duration $f_3$ that is essentially constant and an amplitude $a_3$ that is essentially constant. When the voltage is applied, the electronic control unit 30 checks, as already explained in connection with FIG. 4, whether the difference between the amplitude durations $f_3$ of successive oscillations or between the amplitudes $a_3$ of successive oscillations is greater than a given limit value. In the uniform alternating voltage signal 39 shown in FIG. 6 (voltage U) these differences are approximately zero. In this case, the electronic control unit 30 switches to a diagnostic mode in which signals arriving at the diagnostic connector D are processed. After switching to diagnostic mode, the uniform voltage signal can be changed, for example, by frequency modulation and/or amplitude modulation. The changed signal can be used for the control of the diagnosis, for example, for setting the type of or the frequency of measurements to be carried out.

Apart from the generator 17 and the ignition module 20, the cut-off machine 1 has no further device as an energy supply. Therefore, the analysis of the alternating voltage signal supplied through the positive terminal lead 40 occurs only once enough energy is available for this purpose. The analysis can occur constantly until energy is no longer available at a sufficient level.

Figure 7:
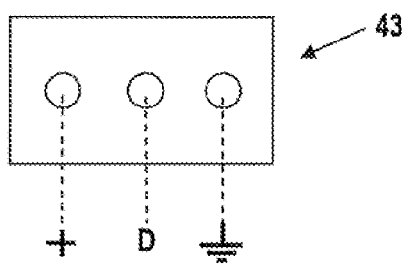
FIG. 7 is a schematic illustration of the connecting jack of the diagnostic device.

FIG. 7 shows schematically the configuration of the connecting jack 43 with positive terminal, diagnostic connector D and ground connector.

In the diagnostic mode, the diagnostic device 31 can-control and/or evaluate through the electronic control unit 30 and the bus system 44 the electrically controllable components of the internal combustion engine 11. For this purpose, for example, all consumers can be switched off and the resulting current input can be measured to determine whether one or several components are defective. Also, it is possible to control single actuators like the fuel valve 27 or the water valve 10 through the electronic control unit 30 and to evaluate the behavior of the valves 10, 27. Other diagnostic possibilities comprise simulating a certain operating condition to the electronic control unit 30, for example, a certain engine speed and/or load, and to evaluate which control action is performed in response by the electronic control unit 30 for the fuel valve 27 and/or the spark plug 29.

Advantageously, the electronic control unit 30 is of a very simple configuration, and the diagnosis occurs, as described, directly at the single components. However, it may also be provided that the electronic control unit 30 has a non-volatile error memory whose data can be read out by the diagnostic device 31 and evaluated.

Figure 8:
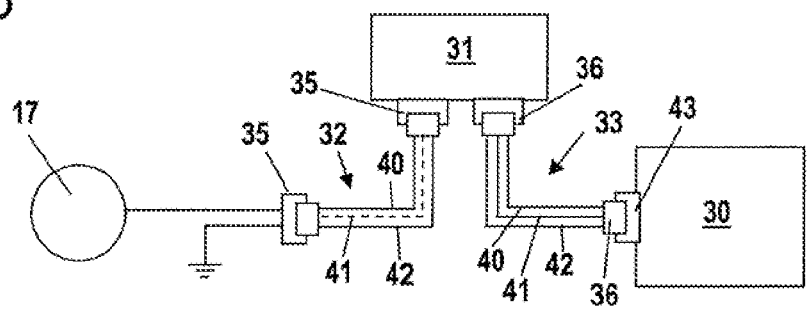
FIG. 8 is a schematic illustration of a connection of generator, diagnostic device and electronic control unit.

In FIG. 5 a connection established between diagnostic device 31 and electronic control unit 30 is shown that is provided for diagnosis when the internal combustion engine 11 is shut down. In order to be able to additionally determine errors in the generator 17 or to be able to carry out a diagnosis while the internal combustion engine 11 is running, the connection shown in FIG. 8 of the diagnostic device 31 with the electronic control unit 30 is provided. Here, the diagnostic device 31 is connected by connecting line 33 with the electronic control unit 30. The connecting line 33 has at its ends plug connectors 36 which are inserted into the diagnostic device 31 and into the connecting jack 43 of the electronic control unit 30. The connecting line 33 has three separate leads, namely a positive terminal lead 40, a diagnostic line 41 and a ground lead 42. The ground lead 42 can be eliminated if necessary. The generator 17 is connected with the connecting line 32 to the diagnostic device 31. Therefore, the diagnostic device 31 is arranged in the electric connection between the generator 17 and the electronic control unit 30. The diagnostic device 31 can therefore communicate also with the generator 17 and evaluate the signal of the generator 17. For this purpose, the connecting line 32 may have optionally an additional diagnostic line 41. This line 41 is shown in dashed lines in FIG. 8.

Since at the connecting jack 43 of the electronic control unit 30 the uniform alternating voltage signal 39 of the diagnostic device 31 is being applied, the electronic control unit 30 automatically switches over to diagnostic mode in which a communication through the diagnostic line 41 is possible.

Figure 9:
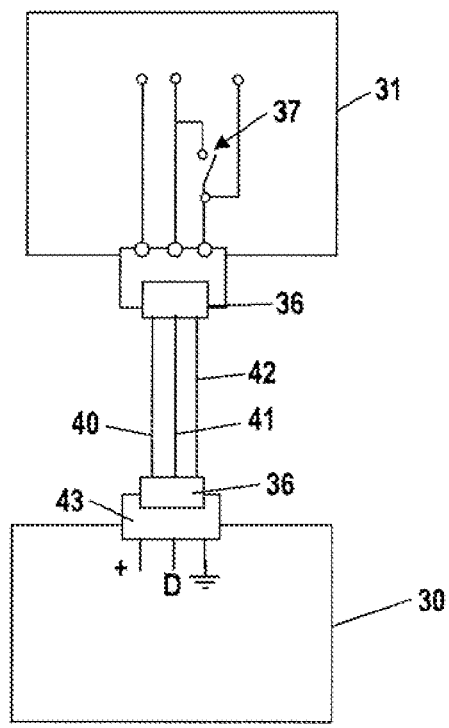
FIG. 9 is a schematic illustration of the connection of electronic control unit and diagnostic device.

It may be desirable to transfer the electronic control unit 30 into an initial state, for example, when parameters that are constantly updated in operation are outside given nominal values. For diagnosis it may also be expedient to transfer the cut-off machine 1 into an initial state. A reset state of the electronic control unit 30 can be obtained, as shown in FIG. 9, in an easy manner in that in the diagnostic mode the diagnostic connector D is connected to a defined ground connector. The defined ground connector can be, for example, the ground connector of the bus system 44 of the electronic control unit 30. In order to obtain the reset state, a switch 37 is advantageously provided in the diagnostic device 31 with which the ground connector can be connected to the diagnostic connector D. A reset of the electronic control unit 30 can thereby be obtained in an easy manner.

Figure 10:
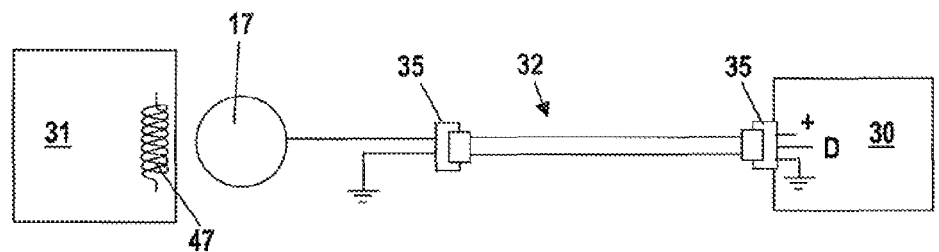
FIG. 10 is a schematic illustration of another connection of electronic control unit and diagnostic device.

FIG. 10 shows a further possibility of the connection of the diagnostic device 31 with the electronic control unit 30. In the illustrated embodiment of FIG. 10 the connection occurs contactless by means of a magnetic alternating field. For this purpose, the diagnostic device 31 has a coil 47 that generates a magnetic alternating field. As a receiving coil the coils of the generator 17 are advantageously used in which an appropriate magnetic alternating field is induced. This induced uniform alternating voltage signal 39 can be used to switch the electronic control unit 30 into diagnostic mode. In this connection, by means of the magnetic alternating field, the uniform alternating voltage signal 39 for supplying energy and also an overlaid modulated signal for transmission of information are transmitted. These signals are separated advantageously from each other only once they are received in the electronic control unit 30 so that the diagnostic connector D of the electronic control unit 30 is not used in this array.

Figure 11:
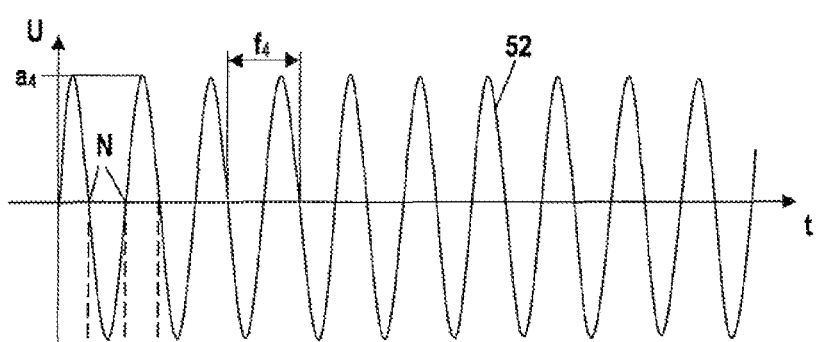
FIG. 11 is a schematic illustration of an embodiment of the alternating voltage signal of the diagnostic device.
Figure 12:
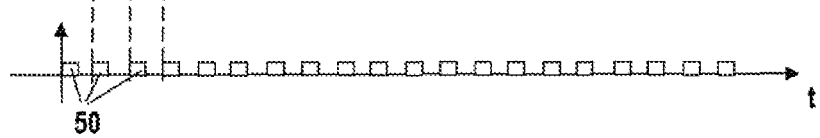
FIG. 12 is a schematic illustration of measurements of the electronic control unit.

FIGS. 11 to 14 show embodiments for the realization of different measurements. FIG. 11 shows a voltage course 52 for a uniform alternating voltage signal with which the electronic control unit 30 is supplied with energy by the diagnostic device 31. The alternating voltage signal 52 of voltage U has an amplitude $a_4$ and an amplitude duration $f_4$. The alternating voltage signal 52 has at zero crossings N half the distance of the amplitude duration $f_4$. The electronic control unit 30 evaluates the amplitude duration $f_4$ and/or the amplitude $a_4$ of the alternating voltage signal 52. Based on the amplitude duration $f_4$, i.e., the frequency of the alternating voltage signal 52, the electronic control unit 30 selects a diagnostic mode. In the illustrated embodiment the electronic control unit 30, as shown in FIG. 12, carries out pressure measurements 50. In this connection, every pressure measurement is triggered by a zero crossing N, so that two pressure measurements 50 are carried out during each amplitude duration $f_4$. In this connection, the pressure measurements 50 can be carried out directly after the zero crossing N or at a given temporal spacing thereafter. It may be provided that the kind of the measurement or measurements to be carried out is determined by means of the amplitude duration $f_4$. Alternatively, the diagnostic mode can also be determined by means of the amplitude $a_4$. Advantageously, the amplitude duration $f_4$ determines the frequency at which the pressure measurements 50 are carried out.

Figure 13:
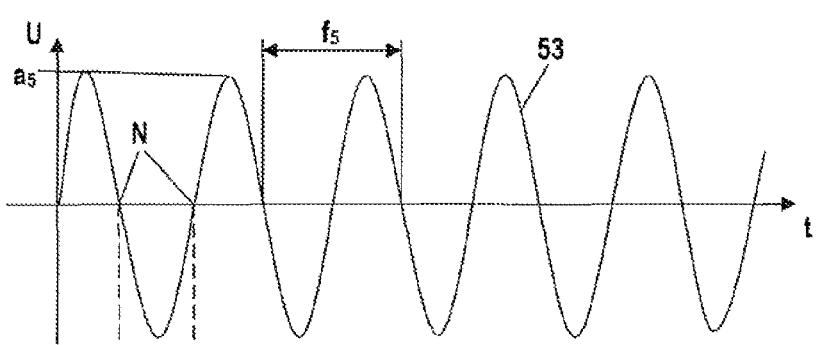
FIG. 13 is a schematic illustration of another embodiment of the alternating voltage signal of the diagnostic device.

In FIG. 13, the electronic control unit 30 is supplied with energy by the diagnostic device 31 by means of an alternating voltage signal 53 whose amplitude duration $f_5$ is significantly greater than the amplitude duration $f_4$ of the alternating voltage signal 52. For example, the amplitude duration $f_5$ of the alternating voltage signal 53 can be twice as great as the amplitude duration $f_4$ of the alternating voltage signal 52. The alternating voltage signal 53 has an amplitude $a_5$ that, in the illustrated embodiment, is smaller than the amplitude $a_4$.

Figure 14:
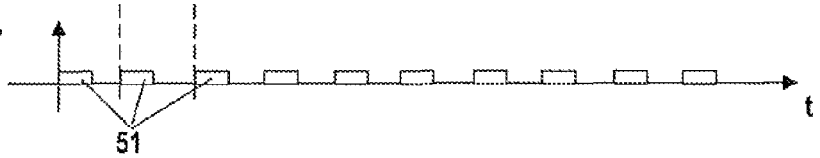
FIG. 14 is a schematic illustration of the course of measurements for the alternating voltage signal of FIG. 13.

Based on the amplitude duration $f_5$ and/or the amplitude $a_5$, another diagnostic mode is selected by the electronic control unit 30. In the illustrated embodiment the electronic control unit 30 carries out, as shown in FIG. 14, temperature measurements 51 that are also initiated by the zero crossings N. Therefore, the number of the carried-out temperature measurements 51 is directly dependent on the amplitude duration $f_5$. By means of the amplitude duration the number of the measurements to be carried out can thus be adjusted easily. It may be provided that, depending on the diagnostic mode, one or several different measurements are carried out, wherein all measurements are triggered advantageously by the zero crossings N. Based on different amplitude durations, it is thus possible to detect, for example, different operating conditions with different engine speeds in the diagnosis.

The specification incorporates by reference the entire disclosure of German priority document 10 2009 057 731.9 having a filing date of Dec. 10, 2009.

While specific embodiments of the invention have been shown and described in detail to illustrate the inventive principles, it will be understood that the invention may be embodied otherwise without departing from such principles.

What is claimed is:

1. A method for operating a power tool with a diagnostic device, wherein the power tool comprises an internal combustion engine, a generator as an energy supply, and an electronic control unit, wherein a diagnostic device is connectable to the electronic control unit, and wherein the electronic control unit has an operating mode and a diagnostic mode; the method comprising the steps of:
   supplying a voltage signal as an energy supply, wherein the generator generates a non-uniform voltage signal as an energy supply and wherein the diagnostic device generates a uniform voltage signal as an energy supply;
   evaluating in the electronic control unit the voltage signal that is being supplied;
   switching to diagnostic mode when the voltage signal is the uniform voltage signal supplied by the diagnostic device.

2. The method according to claim 1, wherein the voltage signal is an alternating voltage signal and wherein, in the step of evaluating, an amplitude duration or an amplitude of the alternating voltage signals is evaluated.

3. The method according to claim 2, comprising the step of selecting by the electronic control unit a diagnosis to be performed as a function of the amplitude duration.

4. The method according to claim 2, comprising the step of selecting by the electronic control unit a diagnosis to be performed as a function of the amplitude.

5. The method according to claim 2, comprising the step of determining by the electronic control unit a frequency of performing a diagnosis.

6. The method according to claim 1, comprising the step of establishing a connection between the electronic control unit and the diagnostic device through electric lines.

7. The method according to claim 6, wherein the generator in the operating mode of the electronic control unit is connected by a positive terminal lead or a phase lead and a ground lead to the electronic control unit, wherein, in the step of establishing a connection, the diagnostic device is connected in the diagnostic mode by a positive terminal lead, a diagnostic line, and a ground lead to the electronic control unit.

8. The method according to claim 6, wherein the electronic control unit has a connecting jack for the generator, wherein the step of establishing a connection comprises connecting the diagnostic device through the connecting jack to the electronic control unit.

9. The method according to claim 6, comprising the step of connecting the generator through the diagnostic device to the electronic control unit.

10. The method according to claim 1, comprising the step of establishing the connection between the diagnostic device and the electronic control unit by an alternating field.

11. The method according to claim 1, wherein the electronic control unit is connected to at least one of an actuator and a sensor, wherein the diagnostic device performs a diagnosis on the at least one of the actuator and the sensor.

12. The method according to claim 1, comprising the step of resetting the electronic control unit into a reset state by the diagnostic device.

13. The method according to claim 12, wherein the electronic control unit has a diagnostic connector for a diagnostic line and wherein resetting is carried out by applying a defined ground signal to the diagnostic connector.

14. The method according to claim 13, wherein applying a defined ground signal is done by connecting the diagnostic connector with a ground connector of the diagnostic device.

15. The method according to claim 1, wherein a diagnostic connector of the electronic control unit is a connector of a bus system of the power tool, wherein at least one of a sensor and an actuator of the power tool is connected to the bus system.

16. The method according to claim 15, wherein the actuator is a valve and wherein the sensor is a temperature sensor, a pressure sensor, or a throttle shaft sensor.

* * * * *